UNITED STATES PATENT OFFICE.

GEORGE S. ENGLE, OF CRANSTON, RHODE ISLAND, ASSIGNOR TO AMERICAN ELEMENTARY ELECTRIC COMPANY, OF WASHINGTON, DISTRICT OF COLUMBIA, A CORPORATION OF THE DISTRICT OF COLUMBIA.

PROCESS OF MAKING ALKALINE GELATINOUS ELECTROLYTES.

1,356,434. Specification of Letters Patent. Patented Oct. 19, 1920.

No Drawing. Application filed October 8, 1912. Serial No. 724,607.

*To all whom it may concern:*

Be it known that I, GEORGE S. ENGLE, a citizen of the United States, residing at Cranston, in the county of Providence and State of Rhode Island, have invented new and useful Improvements in Processes of Making Alkaline Gelatinous Electrolytes, of which the following is a specification.

This invention relates to a process of making or preparing an alkaline gelatinous electrolyte, and the primary object of the invention is to produce an excitant for batteries which will form a wall or fence between the electrodes and prevent dissemination of soluble electrodes or the oxids of the latter throughout the body of the electrolyte, and in the case of a zinc electrode, for instance, will hold the oxid close to the attacked portion thereof and obstruct transmission of the oxid to the adjacent electrode of a different character.

It has been observed that in the action of a battery there is more or less deposits of oxids from the electrodes or plates creating local action and thereby lessening the E. M. F., and it has, therefore, been found necessary in order to maintain the full efficiency and prolong the active life of a battery to interpose a barrier, as it were, said barrier enveloping the electrodes and being of such consistency as to obviate too free movement of the electrolyte and at the same time permit the electro-chemical action to ensue with efficiency of generation of electrical current. Moreover, the electrolyte made in accordance with the improved process and used or coöperating with a zinc plate for the positive electrode absorbs the zinc oxid and holds up the oxid in place adjacent to the zinc plate and prevents rapid destruction of the plate and will also operate to cause the plate to be benefited by holding the zinc oxid in close relation thereto.

In making the improved alkaline gelatinous electrolyte, vegetable starch is combined with an alkaline liquid embodying caustic soda or caustic potash. The alkaline liquid is of 28 specific gravity Baumé, and to this solution the starch is added in the proportion of about one part of starch to ninety parts of the alkaline liquid. The solution is stirred with a glass implement until a thorough mixture of the starch and alkaline liquid results, and the mixture is then subjected to heat until 180° F. is reached, when the heat is immediately shut off.

The mixture is again stirred thoroughly and permitted to cool to proper consistency for pouring into a battery cell so as to form a compact mass in the latter. The gravity of the cooled mass is only slightly in excess of the original gravity of the alkaline liquid. The consistency of the cooled mass must be such as to produce the least possible resistance in the cell and gases pass through the electrolyte with ease and will be permitted to escape by the usual gas vent means.

Practical experiment has demonstrated that four grains of starch are required to gelatinize sixty minims of water, and one-sixth as much starch or two-thirds of a grain to gelatinize a corresponding quantity of the alkaline liquid having a specific gravity of 28 Baumé, and proportionately the parts of starch and alkaline liquid, therefore, are respectively one to ninety as hereinbefore specified. A quantitative analysis shows that ten pounds of caustic soda makes about four gallons of electrolyte mixed with the proper proportion of water, and in relative proportion with ten pounds of soda two thousand seven hundred and thirty-one grains of starch should be used, or to one pound of soda there should be two hundred and seventy-three and one-tenth grains of starch to give the desirable consistency to the gelatin and the best practical results from an electrolytic standpoint.

The specific maximum degree of heat or 180° F., to which the alkaline solution and starch are subjected, is most essential, and is not merely tentative or approximative, but must be adopted to render the alkaline gelatinous electrolyte most serviceable and effective. If the mixture hereinbefore specified is subjected to a greater heat degree, the starch will be converted into other substances that operate to obstruct or deteriorate the electrolyte rather than render it effective as an oxid barrier.

The degree of heat to which the alkaline solution and starch are subjected must be such as to avoid liberation of the constituents of the starch that would have a tendency to harden the electrolyte, and also to set up a gelatinous condition of the electrolyte when disposed in the battery cell and avoid increased internal resistance in the cell when the electrolyte is cooled. If the electrolyte should harden in the cell it would set up a high internal resistance, and, moreover, a strong adherence relatively to the battery elements would result and the replacement of said elements when found necessary as well as the removal of the hardened electrolyte under such conditions would be impracticable, and hence it is necessary to have the electrolyte in a mobile condition when cooled or of such consistency as to avoid hardening action or increased internal resistance. While it has been found that 180° as the maximum heating temperature for the electrolyte is advantageous, it will be understood that the purpose is to avoid liberating the dextrin or other constituents of the starch by heating action to prevent hardening of the electrolyte and to maintain the latter always in a movable gelatinous consistency of such stiffness as to maintain its position relatively to the elements of the cell.

By means of this improved electrolyte acting to segregate the oxids of the battery elements a comparatively uniform resistance is maintained if the battery be properly sealed.

A further advantage of the electrolyte made in accordance with the foregoing process is that it resists low temperatures, and thereby it is particularly adapted for out-of-door work.

Economy in the use of the battery elements as well as prolonged service of the battery without replenishment and rehabilitation, are other advantages due to the electrolyte proposed as heretofore described.

What is claimed is:

1. The herein described process of making an alkaline gelatinous electrolyte, consisting in thoroughly mixing a caustic alkaline solution comprising about one part of starch to ninety parts of the solution and thoroughly stirring the two components, subjecting the mixture of alkaline solution and starch to a degree of heat less than that required to boil the mixture to avoid the liberation of the constituents of starch that would have a tendency to harden the electrolyte, and allowing the mixture to cool to a pouring consistency.

2. The process of making an alkaline gelatinous electrolyte, consisting in thoroughly mixing a caustic alkaline solution with a small proportion of vegetable starch sufficient to impart a gelatinous consistency to the solution without hardening the latter, subjecting the mixture to a degree of heat less than the boiling point of the mixture to produce the requisite gelatinous consistency, and finally allowing the mixture to cool to a pouring consistency.

In testimony whereof I have hereunto set my hand in presence of two subscribing witnesses.

GEORGE S. ENGLE.

Witnesses:
 CHAS. S. HYER,
 CHAS. A. ROWE.